(12) United States Patent
Goto et al.

(10) Patent No.: US 10,638,081 B2
(45) Date of Patent: Apr. 28, 2020

(54) INFORMATION PROCESSING DEVICE

(71) Applicant: DENSO CORPORATION, Kariya, Aichi-pref. (JP)

(72) Inventors: Hiroaki Goto, Kariya (JP); Hirotaka Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/083,831

(22) PCT Filed: Mar. 17, 2017

(86) PCT No.: PCT/JP2017/010984
§ 371 (c)(1),
(2) Date: Sep. 10, 2018

(87) PCT Pub. No.: WO2017/159863
PCT Pub. Date: Sep. 21, 2017

(65) Prior Publication Data
US 2019/0075268 A1 Mar. 7, 2019

(30) Foreign Application Priority Data
Mar. 18, 2016 (JP) .................. 2016-055551

(51) Int. Cl.
*H04N 7/18* (2006.01)
*H04N 5/247* (2006.01)
*B60R 1/00* (2006.01)
*B60R 21/00* (2006.01)
*H04N 5/445* (2011.01)

(52) U.S. Cl.
CPC .......... *H04N 5/44591* (2013.01); *B60R 1/00* (2013.01); *B60R 21/00* (2013.01); *H04N 5/247* (2013.01); *H04N 7/18* (2013.01)

(58) Field of Classification Search
CPC ...... H04N 5/44591; H04N 5/247; H04N 7/18; B60R 1/00; B60R 21/00
See application file for complete search history.

(56) References Cited

U.S. PATENT DOCUMENTS

| 7,161,616 | B1 | 1/2007 | Shusaku et al. |
| 2003/0179293 | A1* | 9/2003 | Oizumi ............... B60R 1/00 348/148 |
| 2012/0169875 | A1 | 7/2012 | Matsukawa et al. |
| 2016/0342849 | A1* | 11/2016 | Kiyo .................. G01S 13/87 |

FOREIGN PATENT DOCUMENTS

| JP | 3300334 B2 | 7/2002 |
| JP | 2013-212723 A | 10/2013 |

* cited by examiner

*Primary Examiner* — Thai Q Tran
*Assistant Examiner* — Jose M Mesa
(74) *Attorney, Agent, or Firm* — Knobbe, Martens, Olson & Bear, LLP

(57) ABSTRACT

An information processing device includes a detection unit, a display control unit, and a determination unit. The display control unit switches a composite image to a generated image, and causes a display device to display the generated image when the determination unit determines that a predetermined condition has been satisfied under the state in which the detection unit has detected that a travel direction of a vehicle is backward.

6 Claims, 5 Drawing Sheets

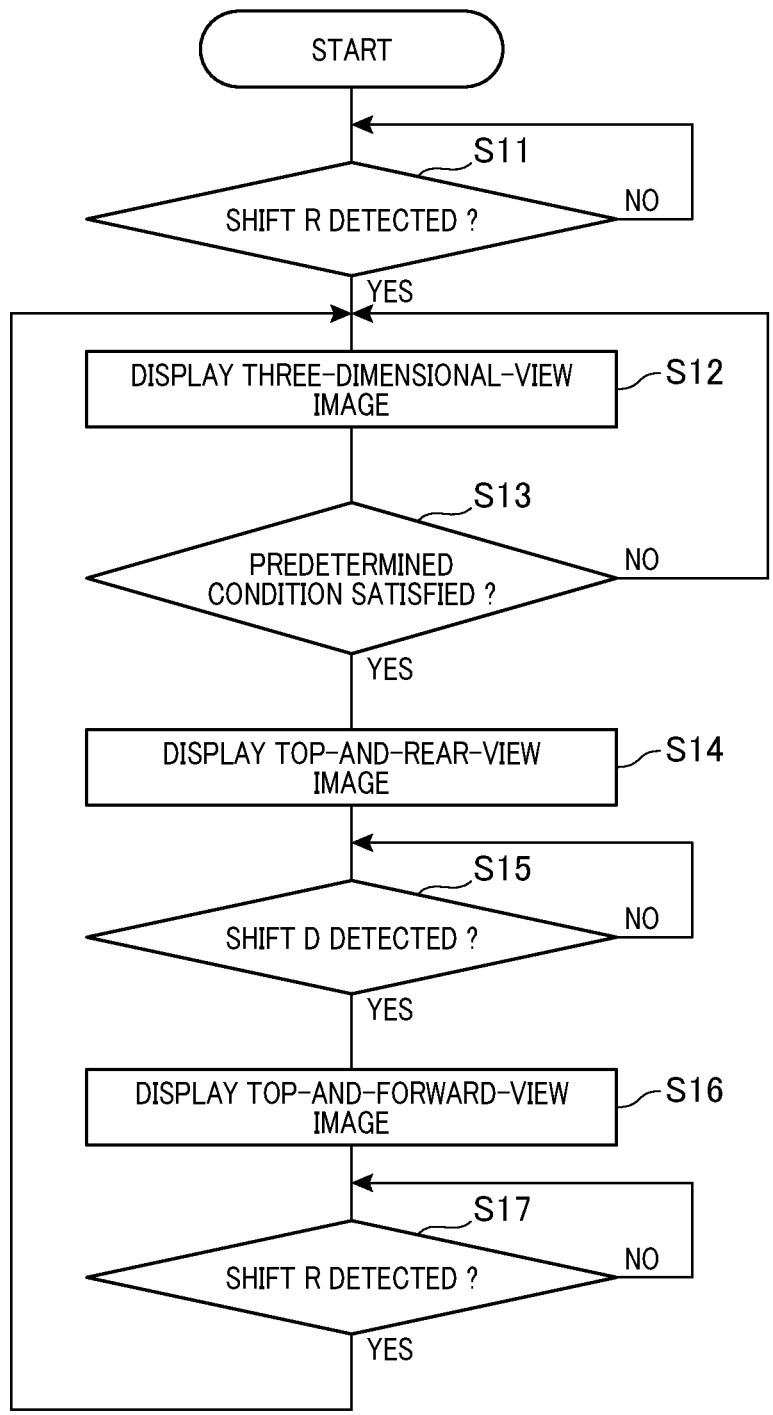

INFORMATION PROCESSING DEVICE

CROSS REFERENCE TO RELATED APPLICATIONS

This application is a national stage application under 35 U.S.C. § 371(c) of PCT Application No. PCT/JP2017/010984, filed on Mar. 17, 2017, which is based on and claims the benefit of priority from earlier Japanese Patent Application No. 2016-055551, filed on Mar. 18, 2016, the description of which is incorporated herein by reference.

TECHNICAL FIELD

The present disclosure relates to a technique for capturing and displaying surroundings of a vehicle.

BACKGROUND ART

Techniques for displaying images of surroundings of a vehicle from a plurality of viewpoints have been known. For example, as disclosed in Patent Literature 1 below, a technique for switching the viewpoints in response to detection of a parking spot for the vehicle has been proposed.

CITATION LIST

Patent Literature

[PTL 1] JP 2013-212723 A

SUMMARY OF THE INVENTION

Through intensive studies, the inventors have found that when the viewpoints of images are changed, the areas around the vehicle, which are easily recognized by passengers in the vehicle, change. As a result, the inventors have found a need to display an image from a suitable viewpoint on a display device even without the detection of a parking spot.

According to the present disclosure, it is desired to provide a technique for displaying images of surroundings of a vehicle in suitable patterns.

According to an aspect of the present disclosure, there is provided an information processing device including a detection unit, a display control unit, and a determination unit. The detection unit is configured to detect when a travel direction of a vehicle is forward, and when the travel direction of the vehicle is backward.

The display control unit is configured to cause, under the state in which the detection unit has detected that the travel direction is backward, a display device to display a composite image or a generated image. The composite image refers to an image that is generated by combining images captured by at least three or more cameras that image surroundings of the vehicle, the combining being performed in a manner that a rear of the vehicle is depicted in a proportion higher than a proportion of a front of the vehicle. Further, the generated image refers to an image that is generated based on an image captured by at least one camera of the at least three or more cameras, the generated image depicting, from a viewpoint that is different from a viewpoint of the composite image, the rear of the vehicle.

The determination unit is configured to determine whether a predetermined condition has been satisfied, the predetermined condition being a condition that is determined based at least on a state of the vehicle under the state in which the composite image is displayed.

Further, the display control unit is configured to switch the composite image to the generated image, and to cause the display device to display the generated image when the determination unit determines that the predetermined condition has been satisfied under the state in which the detection unit has detected that the travel direction is backward.

With such a configuration, the generated image is displayed when the predetermined condition of the state of the vehicle is satisfied under the state in which the travel direction of the vehicle is backward. Thus, images in suitable patterns in accordance with situations can be presented to passengers in the vehicle.

Further, according to another aspect of the present disclosure, there is provided another information processing device including a detection unit, a display control unit, and a determination unit. The detection unit is configured to detect when a travel direction of a vehicle is forward, and when the travel direction of the vehicle is backward.

The display control unit is configured to cause, under the state in which the detection unit has detected that the travel direction is backward, a display device to display a composite image or a generated image. The composite image refers to an image that is generated by combining images captured by at least three or more cameras that image surroundings of the vehicle, the combining being performed in a manner that a rear of the vehicle is depicted in a proportion higher than a proportion of a front of the vehicle. Further, the generated image refers to an image that is generated based on an image captured by at least one camera of the at least three or more cameras, the generated image depicting, from a viewpoint that is different from a viewpoint of the composite image, the rear of the vehicle.

The determination unit is configured to determine whether a display-mode switching condition has been satisfied, the display-mode switching condition including, as a requirement, at least a determination that a situation has previously occurred where the travel direction to be detected by the detection unit is switched from backward to forward under the state in which the generated image is displayed.

Further, the display control unit is configured to cause the display device to display the composite image when the determination unit determines that the display-mode switching condition has been satisfied under the state in which the detection unit has detected that the travel direction is switched from forward to backward. Still further, the display control unit is configured to cause the display device to display the generated image when the determination unit determines that the display-mode switching condition has not been satisfied under the state in which the detection unit has detected that the travel direction is switched from forward to backward.

With such a configuration, the composite image is displayed when the display-mode switching condition is satisfied under the state in which the travel direction of the vehicle has been switched to backward. Thus, images in suitable patterns in accordance with situations can be presented to the passengers in the vehicle.

References in parentheses described in claims indicate correspondence relation with specific means described in embodiments described below as one mode. Thus, the references in parentheses do not limit the technical scope of the present disclosure.

BRIEF DESCRIPTION OF THE DRAWINGS

FIG. 6 is a flowchart showing an image display process according to a second embodiment.

DESCRIPTION OF EMBODIMENTS

With reference to the drawings, embodiments of the present disclosure will be described below.

[1. First Embodiment]

[1-1. Configuration]

Figure 1:
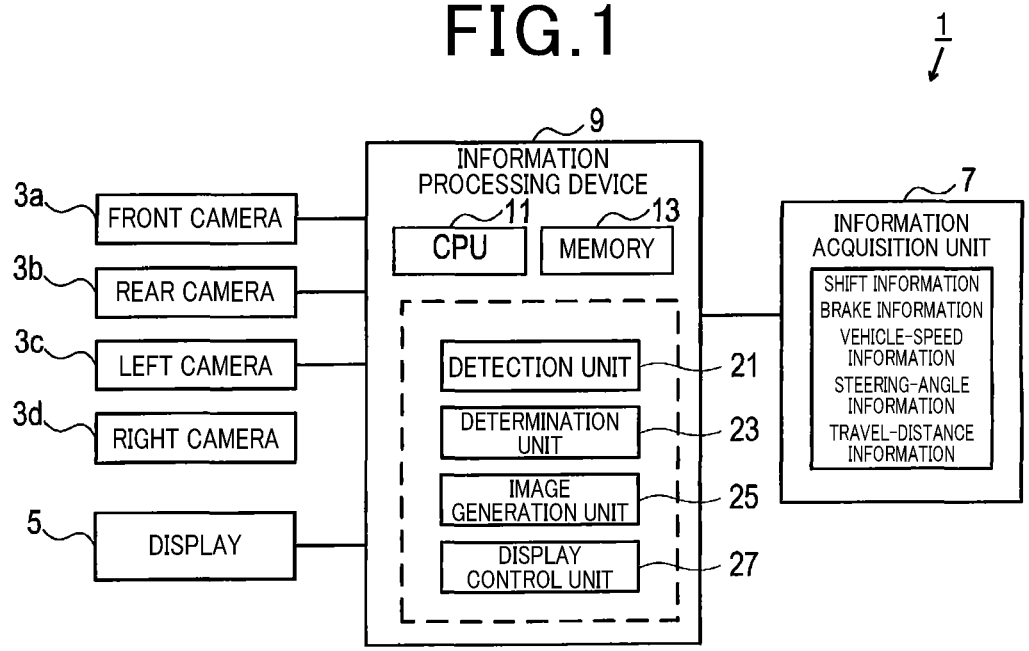
FIG. 1 is a block diagram showing a configuration of an image display system.

An image display system 1 is installed in vehicles such as an automobile. As shown in FIG. 1, the image display system 1 includes a front camera 3a, a rear camera 3b, a left camera 3c, a right camera 3d, a display 5, an information acquisition unit 7, and an information processing device 9, which are installed in the vehicle. In the following description, a camera 3 can include the above-mentioned four cameras 3a, 3b, 3c, and 3d.

The image display system 1 generates a composite image by combining images of surroundings of the vehicle, which are captured by the camera 3, and causes the display 5 to display the composite image.

As the camera 3, there may be used imaging devices provided to the vehicle, such as a CCD image sensor and a CMOS image sensor. The camera 3 captures the surroundings of the vehicle at certain time intervals (for example, 1/15 sec), and outputs the captured images to the information processing device 9. Note that, the front camera 3a, the rear camera 3b, the left camera 3c, and the right camera 3d are arranged to respectively capture forward, backward, left, and right images of the vehicle.

The display 5 is a display device including a liquid-crystal display screen or an OLED display screen. The display 5 displays images in response to signals that are input via the information processing device 9.

The information acquisition unit 7 acquires information items of the vehicle via, for example, a plurality of sensors installed in the vehicle. Specifically, the information acquisition unit 7 acquires, for example, a shift information item indicating a position of an operated selector (lever for shifting), a brake information item indicating an operating amount of a brake pedal, a vehicle-speed information item indicating a travel speed of the vehicle, a steering-angle information item indicating a turning angle of a steering wheel, and a travel-distance information item indicating a travel distance of the vehicle. The travel-distance information item can be calculated based on the travel speed and the travel distance. After the information acquisition unit 7 acquires the vehicle information items, the information acquisition unit 7 outputs these vehicle information items to the information processing device 9.

The information processing device 9 includes a microcomputer including a CPU 11, semiconductor memories such as a RAM, ROM, and a flash memory (hereinafter, collectively referred to as memory 13). The information processing device 9 has various functions that are exerted when the CPU 11 executes programs stored in a non-transitory tangible computer readable medium. In this example, the memory 13 corresponds to the non-transitory tangible computer readable medium storing the programs.

Further, when these programs are executed, methods corresponding to the programs are carried out. Note that, the information processing device 9 may include the single microcomputer, or may include a plurality of microcomputers.

As shown in FIG. 1, the information processing device 9 includes a detection unit 21, a determination unit 23, an image generation unit 25, and a display control unit 27 as components having the functions to be exerted by the execution of the programs by the CPU 11. A technique of activating these units in the information processing device 9 is not limited to software, and some or all of these units may be activated with hardware constituted, for example, by a combination of logic circuits and analog circuits.

The detection unit 21 detects when a travel direction of the vehicle is forward, and when the travel direction of the vehicle is backward. In the present embodiment, based on the shift information item acquired by the information acquisition unit 7, the detection unit 21 detects the travel directions of the vehicle. Note that, the detection unit 21 may detect the travel directions based on information items other than the shift information item. For example, the detection unit 21 may detect the travel directions based, for example, on detected values (more specifically, vehicle-speed information items) from the various sensors that generate different outputs in accordance with the travel directions.

The determination unit 23 determines whether a predetermined condition has been satisfied under the state in which a composite image described below is displayed, and whether a display-mode switching condition described below has been satisfied. These conditions, which are based on a state of the vehicle, are described in detail below.

The image generation unit 25 generates, based on the images captured by the camera 3, an image from one or more viewpoints that are different from any of viewpoints of the cameras 3a, 3b, 3c, and 3d. Note that, the viewpoints herein each refer to a standpoint from which a captured target is viewed. A technique for generating an image from a different viewpoint based on images captured from different viewpoints has been known, and hence description thereof is omitted.

The display control unit 27 causes the display 5 to display the images of the surroundings of the vehicle when the detection unit 21 has detected that the travel direction of the vehicle is backward. The images to be displayed include two types, that is, composite images and generated images.

The composite image refers to an image that is generated by combining the images captured by at three or more of the cameras 3a, 3b, 3c, and 3d that capture the surroundings of the vehicle, the combining being performed in a manner that a rear of the vehicle is depicted in a proportion higher than that of a front of the vehicle.

The generated image refers to an image that is generated based on the image captured by at least one camera of the at least three or more cameras for generating the composite image, and that depicts, from a viewpoint different from that of the composite image, the rear of the vehicle. The camera that captures the image contained in the generated image may correspond to some of the three or more cameras that capture the images contained in the composite image, or all the cameras that capture the images contained in the composite image.

Further, the display control unit 27 causes the display 5 to display a forward image when the travel direction of the vehicle, which the detection unit 21 detects, is switched from backward to forward.

An example of the image to be displayed on the display 5 is described with reference to FIGS. 2 and 3.

Figure 2:
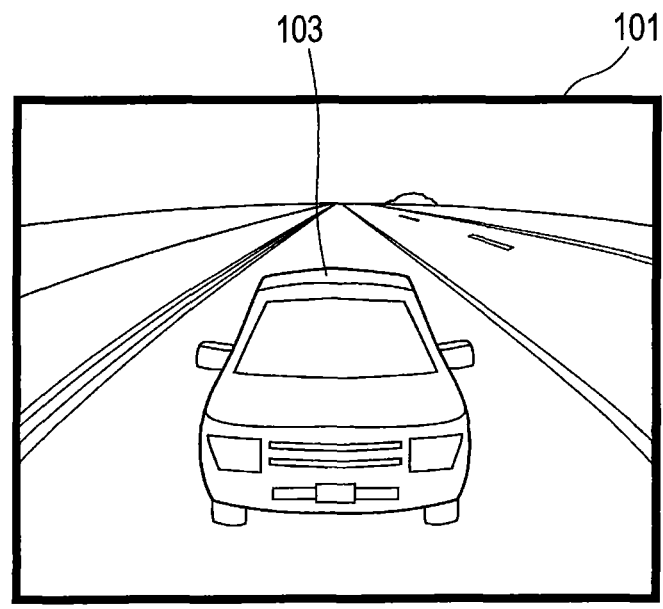
FIG. 2 is a view showing a three-dimensional-view image to be displayed on a display.

FIG. 2 is a view of a three-dimensional-view image 101 being an image that depicts a vehicle 103, which has the image display system 1 installed therein, obliquely backward from a viewpoint located on a forward-and-upper side of the vehicle 103.

This three-dimensional-view image 101 is generated by combining images captured by the four cameras 3a, 3b, 3c, and 3d, or images captured by three of the cameras 3b, 3c, and 3d except the front camera 3a. The vehicle 103 itself is not captured by the cameras 3, and hence a previously prepared image is used for the combining.

In this three-dimensional-view image 101, a proportion of depicting the rear of the vehicle 103 is higher than a proportion of depicting the front of the vehicle 103, and hence the rear of the vehicle 103 can be recognized as a wide area. Further, positional relationships between depicted objects and the vehicle 103 in the image can be easily recognized. In other words, the three-dimensional-view image 101 is suitable for checking the surroundings in a relatively wide range when the vehicle has stopped or immediately after the vehicle has started to travel, specifically, at the beginning of driving or parking. This three-dimensional-view image 101 corresponds to the composite image.

Figure 3:
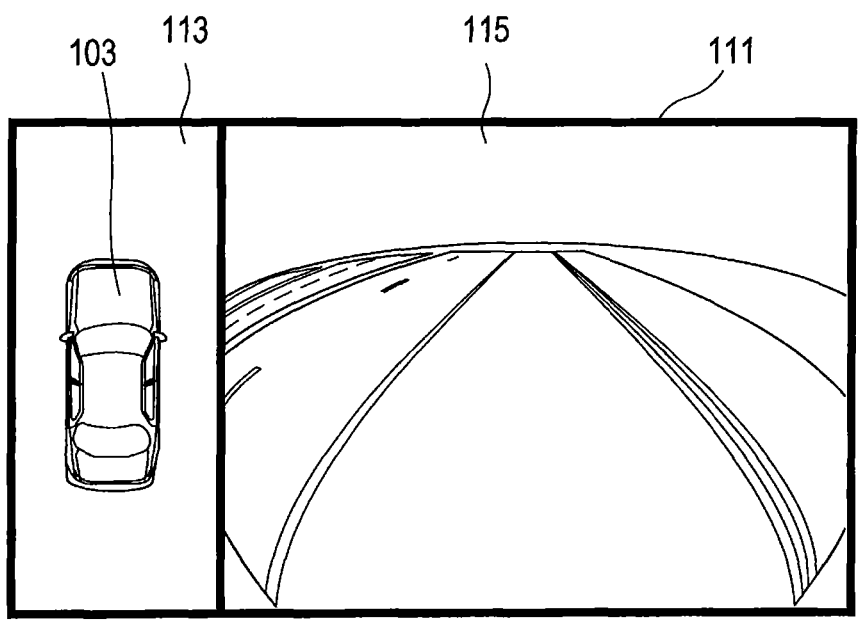
FIG. 3 is a view showing a top-and-rear-view image to be displayed on the display.

FIG. 3 is a view showing a top-and-rear-view image 111 being a combined image of a top-view image 113 and a rear-view image 115. The top-view image 113 is an image that depicts the vehicle 103 downward from a viewpoint right above the vehicle 103. The rear-view image 115 is a rear image depicting the rear of the vehicle 103, which is captured by the rear camera 3b.

The top-view image 113 is generated by combining the images captured by the four cameras 3a, 3b, 3c, and 3d and the prepared image of the vehicle 103. Specifically, the top-view image 113 is a bird's-eye-view image in which the vehicle 103 having the image display system 1 installed therein is viewed downward from right above. For example, the top-view image 113 may be generated by combining the images captured by the four cameras 3a, 3b, 3c, and 3d with each other. Alternatively, the top-view image 113 may be generated by combining the images captured by the front camera 3a and the rear camera 3b, and images previously captured by these cameras with each other.

The rear-view image 115 mainly depicts a range relatively close to the vehicle 103 on the rear of the vehicle 103. The rear-view image 115 is generated based on the image captured by the rear camera 3b. The rear-view image 115 is suitable for more detailed checking of a relatively narrow range around the vehicle than that with use of the above-described three-dimensional-view image 101 at the time of, for example, parking or backwards and forwards. This rear-view image 115 corresponds to the generated image.

Further, the above-mentioned forward image refers to an image that depicts a lower side at the front of the vehicle, which is captured by the front camera 3a. This forward image mainly depicts a range close to the vehicle at the front of the vehicle, which is a blind spot of a driver of the vehicle.

Figure 4:
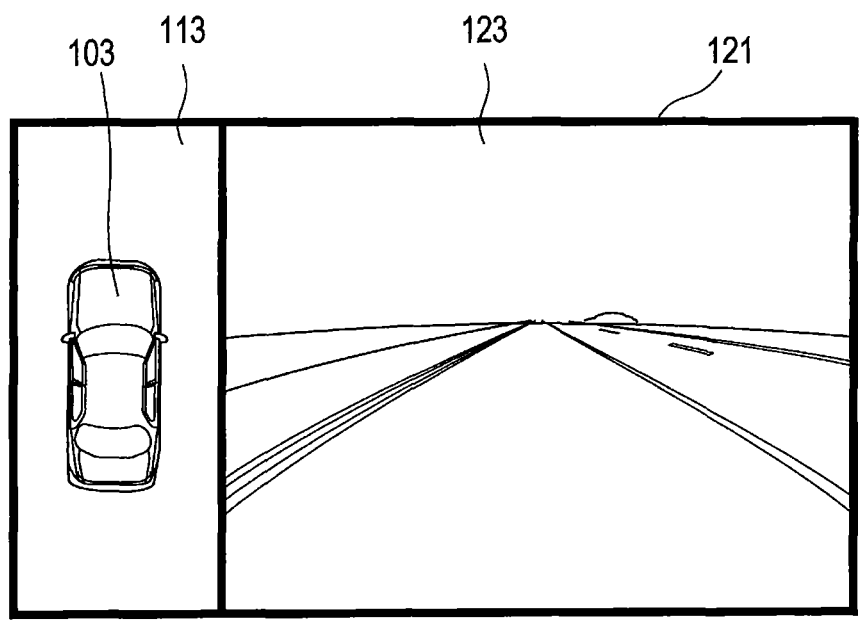
FIG. 4 is a view showing a top-and-forward-view image to be displayed on the display.

FIG. 4 is a view showing a top-and-forward-view image 121 being a combined image of the top-view image 113 as in FIG. 3 and a forward-view image 123 being an image depicting the front of the vehicle 103, which is captured by the front camera 3a. The forward-view image 123 corresponds to the above-mentioned forward image.

Note that, the image to be displayed on the display 5 is updated at predetermined time intervals (for example, 1/15 s) to images based on images that are newly captured by the camera 3. Further, the display control unit 27 executes the following two series of processes (A) and (B).

(A) Series of processes including switching the composite image to the generated image and causing the display 5 to display the generated image when the determination unit 23 determines that the predetermined condition has been satisfied under the state in which the detection unit 21 has detected that the travel direction is backward.

(B) Series of processes including causing the display 5 to display the composite image when the determination unit 23 determines that a display-mode switching condition has been satisfied under the state in which the detection unit 21 has detected that the travel direction is switched from forward to backward, and meanwhile, causing the display 5 to display the generated image when the determination unit 23 determines that the display-mode switching condition has not been satisfied under the state in which the detection unit 21 has detected that the travel direction is switched from forward to backward.

An image display process for executing these series of processes (A) and (B) is described below.

[1-2. Process]

Figure 5:
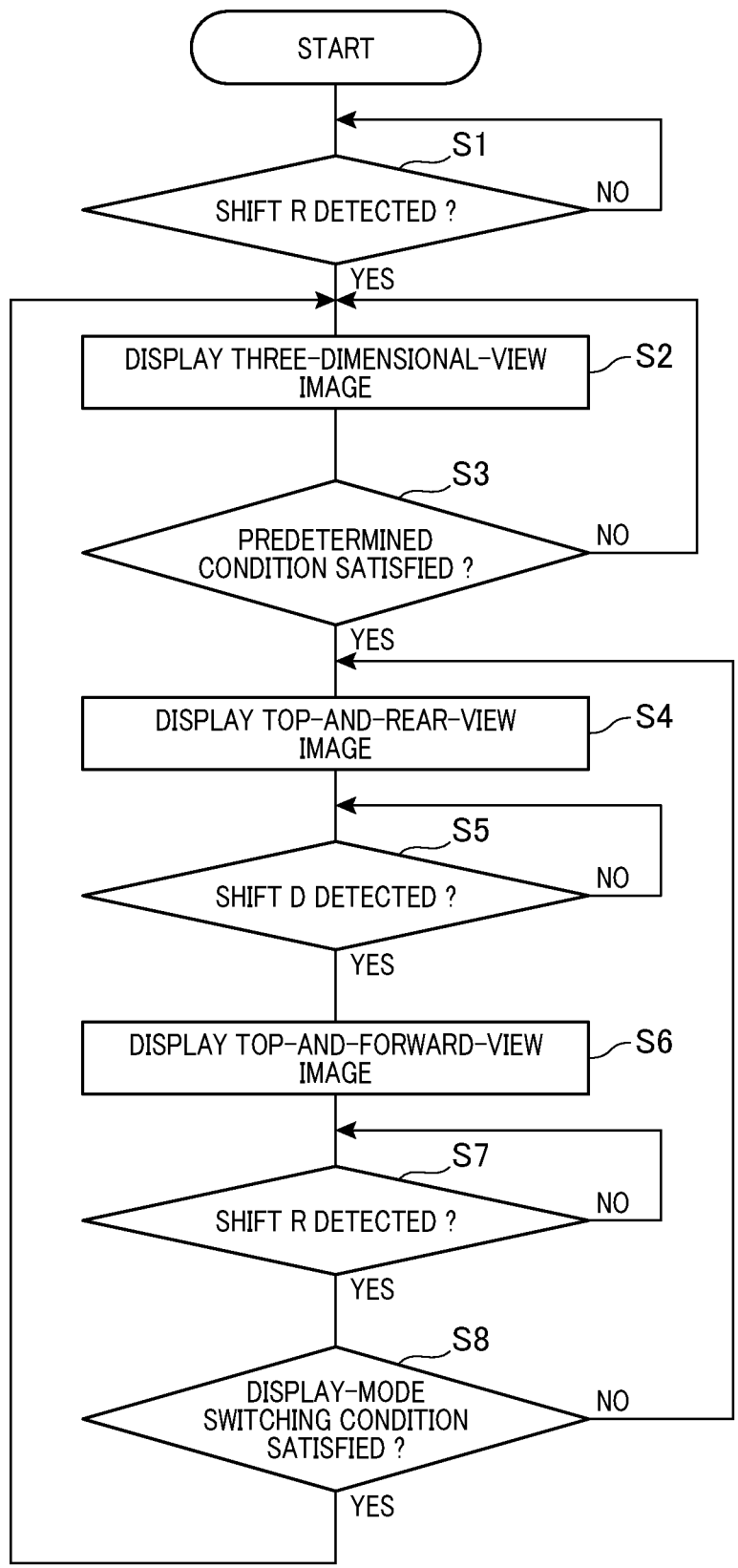
FIG. 5 is a flowchart showing an image display process according to a first embodiment.

Next, with reference to the flowchart of FIG. 5, the image display process that the CPU 11 of the information processing device 9 carries out is described. This process is carried out under the state in which accessory switches of the own vehicle have been turned on.

First, in S1, based on the shift information item, the CPU 11 determines whether a shift of the selector (lever for shifting) to "R" has been detected. The "R" refers to a reverse range, that is, a range into which the selector is shifted at a time of reversing the vehicle. Note that, in the following description, the state in which the selector has been shifted to "R" is simply referred to also as "shift R." When the shift R is detected in this S1, the process proceeds to S2. Meanwhile, when the shift R is not detected, the process returns to S1. Note that, although the travel direction of the vehicle is detected based on the position of the selector, that is, the shift information item in this process, the travel direction may be detected based on the information items other than the shift information item.

In S2, the CPU 11 causes the display 5 to display the above-described three-dimensional-view image 101.

In S3, the CPU 11 determines whether the predetermined condition has been satisfied. A specific requirement of the predetermined condition is that the vehicle has started to travel. Whether or not the predetermined condition has been satisfied can be determined based, for example, on whether a vehicle speed has exceeded a predetermined speed (for example, 0 or 5 km/h) or whether brakes have been disengaged.

Note that, the travel distance after the selector has been shifted to "R" has exceeded a predetermined distance may be set as the specific requirement of the predetermined condition. Further, in that case, a distance until the condition is satisfied may be notified of. Still further, the predetermined distance may be changed by a user. Yet further, the predetermined distance may be dynamically changed in accordance with a steering angle. For example, on a premise that the steering gradually approaches a straight forward position as a distance to a parking target position becomes shorter, it is conceivable to set the predetermined distance shorter as a turning angle of the steering becomes lower.

In addition, the steering gradually approaches the straight forward position as the distance to the parking target position becomes shorter as described above, and hence, simply, a determination that the turning angle of the steering is equal to or lower than a predetermined angle may be set as the predetermined condition. The predetermined angle corresponds to a predetermined threshold. Alternatively, a determination that the turning angle of the steering, which has once exceeded the predetermined angle, has decreased to be equal to or lower than the predetermined angle may be set as the predetermined condition. Still alternatively, detection of a parking spot may be set as the predetermined condition.

When a determination that the predetermined condition has been satisfied is made in this S3, the process proceeds to S4. Meanwhile, when a determination that the predetermined condition has not been satisfied is made, the process returns to S2.

In S4, the CPU 11 causes the display 5 to display the above-mentioned top-and-rear-view image 111. In other words, the processes of S1 to S4 correspond to the above-described series of processes (A).

Note that, at the time of switching the images to be displayed on the display 5, a morphing technique may be used, or the images to be displayed may be generated from a viewpoint that gradually moves around the vehicle. Also at times of switching the images for other purposes, the images may be displayed in the same way.

In S5, based on the shift information item, the CPU 11 determines whether a shift of the selector (lever for shifting) to "D" has been detected. The "D" refers to a drive range, that is, a range into which the selector is shifted at the time of advancing the vehicle. Note that, in the following description, the state in which the selector has been shifted to "D" is simply referred to also as "shift D." When the shift D is detected in this S5, the process proceeds to S6. Meanwhile, when the shift D is not detected, the process returns to S5.

In S6, the CPU 11 causes the display 5 to display the above-mentioned top-and-forward-view image 121. In other words, when the travel direction detected by the detection unit 21 is switched from backward to forward, the forward image is displayed on the display 5.

In S7, based on the shift information item, the CPU 11 determines whether the shift R has been detected. When the shift R is detected in this S7, the process proceeds to S8. Meanwhile, when the shift R is not detected, the process returns to S7.

In S8, the CPU 11 determines whether the display-mode switching condition has been satisfied. The display-mode switching condition is satisfied when both the following specific requirements (i) and (ii) are satisfied, and hence the determination that the display-mode switching condition has been satisfied is made when both the requirements are satisfied.

(i) That the situation has previously occurred where the travel direction to be detected by the detection unit 21 is switched from backward to forward under the state in which the generated image is displayed on the display 5.

(ii) That a vehicle has advanced by a predetermined distance (for example, 3 m) or longer after the travel direction is switched from backward to forward.

Note that, in the requirement (i), the word "before" means a timing before the determination in S8 is made. Thus, as long as the requirement (i) is satisfied within a predetermined period before the shift R is detected in S7, the requirement (i) can be satisfied even when the shift D has not been detected at a timing when the shift R is detected in S7.

When the determination that the display-mode switching condition has been satisfied is made in this S8, the process returns to S2. In other words, the three-dimensional-view image 101 being the composite image is displayed on the display 5.

Meanwhile, when the determination that the display-mode switching condition has not been satisfied is made in S8, the process returns to S4. In other words, the top-and-rear-view image 111 including the generated image is displayed on the display 5.

The processes of S5 to S8 and the processes of S2 and S4 subsequent thereto correspond to the above-described series of processes (B).

[1-3. Advantages]

According to the first embodiment described above in detail, the following advantages can be obtained.

(1a) According to the image display system 1 of the present embodiment, in a case where a travel direction of a vehicle is backward, when a state of the vehicle has satisfied a predetermined condition, a generated image is displayed. Specifically, when the shift R is detected, first, an image of a wide range around the vehicle is displayed, and then, when the vehicle has started to move backward and thereby the predetermined condition is satisfied, an image depicting a narrow range near the vehicle is displayed. In this way, images in suitable patterns in accordance with situations of the vehicle can be presented to passengers in the vehicle.

(1b) According to the image display system 1 of the present embodiment, as in the top-and-rear-view image 111 and the top-and-forward-view image 121, the bird's-eye-view image and the forward image or the backward image of the vehicle are displayed together. With this, the passengers can understand a situation around the vehicle at a high level.

(1c) According to the image display system 1 of the present embodiment, the passengers in the vehicle can recognize the suitable images in accordance with situations. Specifically, when the selector (lever for shifting) is operated to switch the shift R to the shift D and then to the shift R, images to be displayed are switched in accordance with a travel distance in the shift D. When this distance is short, an image of a relatively narrow range, such as a part of the image from the rear camera 3b, is displayed on the display. Further, when the distance is long, for example, an image that mainly depicts a wide range on the rear of the vehicle, which is generated by combining the image from the rear camera 3b and the images from the cameras 3c and 3d on both the sides with each other, is displayed.

Specifically, at the time of parking, when the shift D is immediately switched to the shift R so as to finely adjust a position of the vehicle, the top-and-rear-view image 111 that facilitates visual recognition of the near range is displayed. Further, as another example, at the time of parking the vehicle changes the place of the parking spot in a parking lot, when the vehicle travels by a predetermined distance or longer after the switching from the shift R to the shift D is performed, the three-dimensional-view image 101 that facilitates visual recognition of the wide range is displayed.

(1d) According to the image display system 1 of the present embodiment, when the selector (lever for shifting) is operated to switch the shift R to the shift D, the lower side at the front of the vehicle is displayed. With this, even when a driver who has once concentrated on a reverse operation advances the vehicle, the driver can recognize a blind-spot area in a travel direction. Thus, an obstacle that approaches the front of the vehicle during the reverse operation is less liable to be overlooked.

[2. Second Embodiment]

[2-1. Differences from First Embodiment]

A basic configuration of a second embodiment is the same as that of the first embodiment. Thus, without description of common configuration features, differences therebetween are mainly described. Note that, the same reference signs as those described in the foregoing first embodiment denote the same components.

In the second embodiment, the process that the CPU 11 carries out includes different processes.

[2-2. Process]

With reference to the flowchart of FIG. 6, the process that the CPU 11 of the information processing device 9 according to the second embodiment carries out instead of the image display process according to the first embodiment shown in FIG. 5 is described. Note that, processes of S11 to S16 in FIG. 6 are the same as the processes of S1 to S6 in FIG. 5, and hence description thereof is omitted.

In S17, based on the shift information item, the CPU 11 determines whether the shift of the selector to "R" has been detected. When the shift R is detected in this S17, the process returns to S12. Meanwhile, when the shift R is not detected, the process returns to S17.

In other words, in the second embodiment, whether the display-mode switching condition has been satisfied is not determined, and the three-dimensional-view image 101 is displayed as long as the selector has been shifted to "R."

[2-3. Advantages]

According to the second embodiment described above in detail, the following advantages can be obtained.

(2a) According to the image display system 1 of the present embodiment, when the selector (lever for shifting) is operated to switch the shift R to the shift D and then to the shift R, the three-dimensional-view image 101 is displayed on the display 5. Thus, for example, at the time of parking, the passengers in the vehicle can recognize the surroundings of the vehicle before moving the vehicle backward, and hence can satisfactorily recognize obstacles and the like around the vehicle.

(2b) After the shift D is switched to the shift R, the three-dimensional-view image 101 is displayed on the display 5, and then the top-and-rear-view image is displayed when the predetermined condition is satisfied. With this, a vicinity of the vehicle is displayed, which is convenient to a situation where it is desired to display the vicinity of the vehicle.

[3. Other Embodiments]

With regard to the description of the embodiments for carrying out the present disclosure, the present disclosure is not limited to the above-described embodiments, and can be carried out in various other embodiments.

(3a) According to the configurations exemplified in the above-described embodiments, when a passenger himself/herself drives a vehicle, screens on the display 5 are changed in response to the operations of the selector (lever for shifting). However, the present disclosure can be carried out also in a vehicle in which a control device performs autonomous driving control of performing some of or all the drive operations in place of the passenger. For example, in a case where what is automatically performed by the autonomous driving control is limited to parking, when images are displayed as in the above-described embodiments, the passenger is allowed to check surroundings of the vehicle on the display 5, and can feel more relaxed.

(3b) According to the configurations exemplified in the above-described embodiments, the four cameras are installed in the vehicle. However, the number of the cameras is not particularly limited to four, and five or more cameras may be provided, or three cameras may be provided. Note that, at least one of the cameras may be arranged at a position where the rear of the vehicle can be captured.

Note that, in the configuration in which the rear of the vehicle is captured by the one of the cameras, images captured by the camera, and images changed in viewpoint by image processes on the images captured by the camera can be used as the rear image.

Note that, when the camera that captures the rear of the vehicle, and the two cameras that capture both the right-hand side and the left-hand side of the vehicle, are provided, the composite image that depicts a wide area around the rear of the vehicle, such as the three-dimensional-view image 101, can be suitably generated.

(3c) According to the configurations exemplified in the above-described embodiments, the rear-view image 115 being an image based on the images captured by the rear camera 3*b* is displayed as the generated image of the rear.

However, the generated image may be, for example, an image subjected to the image processes such as the viewpoint conversion, a trimmed image, an image generated by combining images captured by a plurality of cameras. The camera to be used for generating the generated image may be the one or more of the plurality of cameras used for generating the composite image.

Further, the composite image and the generated image may each include a plurality of types.

(3d) In the above-described embodiments, the display 5 is exemplified as the display device. However, as long as the images can be displayed, the configuration of the display device is not particularly limited, and various display devices may be employed.

(3e) According to the configuration exemplified in the above-described first embodiment, the determination unit 23 detects, as the display-mode switching condition, that both the above-described requirements (i) and (ii) have been satisfied. However, as long as the display-mode switching condition includes at least the above-described requirement (i), the display-mode switching condition need not necessarily include the requirement (ii), or may include other requirements.

For example, a fact that a period from the detection of the shift D in S5 to the detection of the shift R in S7 in FIG. 5 is equal to a predetermined threshold or more or less may be set as one of the other conditions. Note that, this threshold may be freely set by the user. The three-dimensional-view image 101 is more likely to be displayed as the threshold is set smaller, and the rear-view image 115 is more likely to be displayed as the threshold is set larger.

(3f) When the shift R is switched to the shift D, the following information items (i) and (ii) may be displayed on the display 5. (i) Information item indicating which of the three-dimensional-view image 101 and the top-and-rear-view image 111 is currently going to be displayed in response to next switching to the shift R. (ii) Information item indicating a condition of displaying a different image in response to the next switching to the shift R.

For example, it is conceivable to provide a configuration of causing the display 5 to display messages "View to Be Displayed Next: Backward View" and "3 m Left for Changing View to Be Displayed Next" immediately after the switching to the shift D, reducing a numerical value in the latter message along with travel of the vehicle, clearing the latter message when the numerical value reaches zero, and switching the former message to "View to Be Displayed Next: Three-Dimensional View."

(3g) According to the configurations exemplified in the above-described embodiments, when the selector has been shifted to "D," the forward image that depicts the front of the vehicle is displayed. However, the forward image need not necessarily be displayed.

(3h) According to the configurations exemplified in the above-described embodiments, the three-dimensional-view image 101 corresponding to the composite image that depicts the relatively wide range, and the rear-view image 115 corresponding to the generated image that depicts the relatively narrow range can be displayed.

However, patterns of the images that can be displayed are not limited to the two types of the above-described embodiments, and various patterns in which the rear of the vehicle can be depicted from different viewpoints may be employed. For example, as long as the rear of the vehicle is depicted, even an image from, for example, a viewpoint right above the vehicle can be used as the composite image and the generated image.

Further, the plurality of images may be displayed simultaneously.

(3i) According to the configuration exemplified in the above-described first embodiment, when the display-mode switching condition is satisfied, the three-dimensional-view image 101 is displayed. However, when the display-mode switching condition is satisfied, images other than the three-dimensional-view image 101 may be displayed. For example, when the display-mode switching condition is satisfied, the rear-view image 115 may be displayed, or the top-view image that depicts a wide area around of the vehicle may be displayed.

(3j) A function of one of the plurality of components in the above-described embodiments may be exerted in a distributed manner by the plurality of components, or functions of the plurality of components may be exerted by the one of the plurality of components. Alternatively, the plurality of functions of the plurality of components may be exerted by one of the plurality of components, or a single function to be exerted by the plurality of components may be exerted by the one of the plurality of components. Further, parts of the configurations of the above-described embodiments may be omitted. Still further, at least the parts of the configurations of the above-described embodiments may be added to or replaced with other parts of the configurations of the above-described embodiments. Note that, the embodiments of the present disclosure correspond to all the examples encompassed within the technical idea specified only by the wording of the claims.

(3k) The present disclosure is not limited to the above-described information processing device 9, and may encompass various other embodiments such as a system including the information processing device 9 as a component, a program for causing a computer to function as the information processing device 9, non-transitory tangible computer readable medium storing this program, such as a semiconductor memory, and an image display method.

The invention claimed is:

1. An information processing device, comprising:
a detection unit configured to detect when
a travel direction of a vehicle is forward, and
the travel direction of the vehicle is backward;
a display control unit configured to cause, under a state in which the detection unit has detected that the travel direction is backward, a display device to display
a composite image being an image that is generated by combining images captured by at least three or more cameras that capture surroundings of the vehicle, the combining being performed in a manner that a rear of the vehicle is depicted in a proportion higher than a proportion of a front of the vehicle, or
a generated image being an image that is generated based on an image captured by at least one camera of the at least three or more cameras, the generated image depicting, from a viewpoint that is different from a viewpoint of the composite image, the rear of the vehicle; and
a determination unit configured to determine whether a predetermined condition has been satisfied, the predetermined condition being a condition that is determined based at least on a state of the vehicle under a state in which the composite image is displayed,
the display control unit being configured
to switch the composite image to the generated image, and
to cause the display device to display the generated image when the determination unit determines that the predetermined condition has been satisfied under a state in which the detection unit has detected that the travel direction is backward.

2. The information processing device according to claim 1, wherein the predetermined condition includes, as a requirement, at least any one of
a travel speed of the vehicle having exceeded a predetermined speed,
the vehicle having traveled by a predetermined distance after the detection unit has detected that the travel direction is backward,
a steering angle being equal to or less than a predetermined threshold, and
a parking spot having been detected.

3. The information processing device according to claim 1, wherein the composite image includes an image that depicts a relatively wider range than the generated image.

4. The information processing device according to claim 1, wherein the display control unit is configured to cause the display device to display the generated image together with a bird's-eye view being an image of the vehicle as viewed from above the vehicle, the bird's-eye-view image being generated based on images captured by at least two or more cameras that capture the surroundings of the vehicle.

5. An information processing device, comprising:
a detection unit configured to detect when
a travel direction of a vehicle is forward, and
the travel direction of the vehicle is backward;
a display control unit configured to cause, under a state in which the detection unit has detected that the travel direction is backward, a display device to display
a composite image being an image that is generated by combining images captured by at least three or more cameras that capture surroundings of the vehicle, the combining being performed in a manner that a rear of the vehicle is depicted in a proportion higher than a proportion of a front of the vehicle, or
a generated image being an image that is generated based on an image captured by at least one camera of the at least three or more cameras, the generated image depicting, from a viewpoint that is different from a viewpoint of the composite image, the rear of the vehicle; and
a determination unit configured to determine whether a display-mode switching condition has been satisfied, the display-mode switching condition including, as a requirement, at least a determination that a situation has previously occurred where the travel direction to be detected by the detection unit is switched from backward to forward under a state in which the generated image is displayed, the display control unit being configured to cause the display device to display the composite image when the determination unit determines that the display-mode switching condition has been satisfied under a state in which the detection unit has detected that the travel direction is switched from forward to backward, and meanwhile, to cause the display device to display the generated image when the determination unit determines that the display-mode switching condition has not been satisfied under a state in which the detection unit has detected that the travel direction is switched from forward to backward.

6. The information processing device according to claim 5, wherein the display-mode switching condition includes, as a requirement, that the vehicle has traveled forward by a predetermined distance or longer after the travel direction is switched from backward to forward.

* * * * *